UNITED STATES PATENT OFFICE.

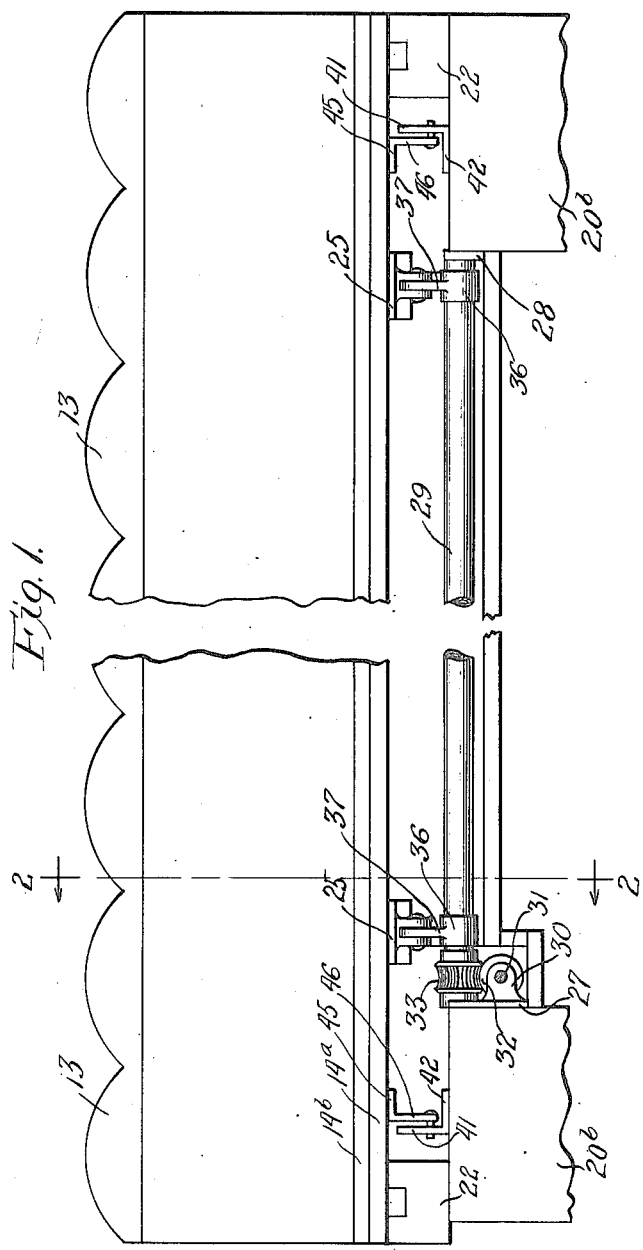

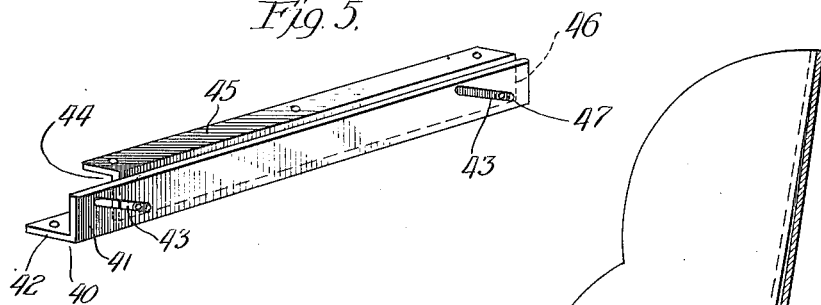
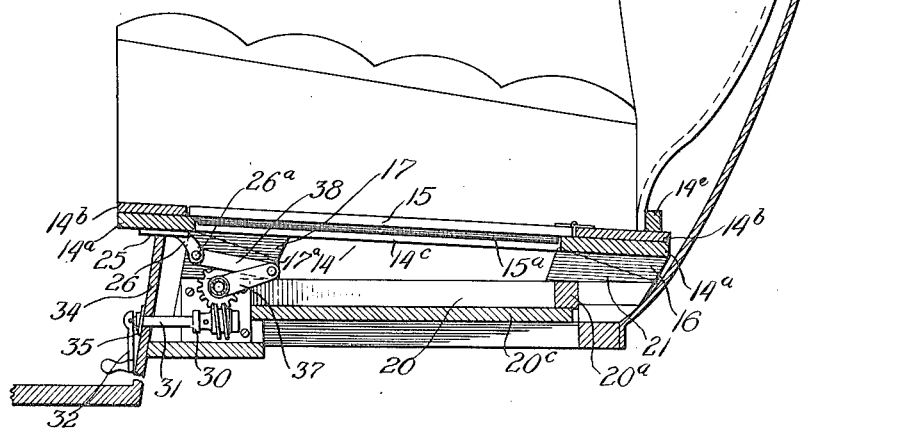

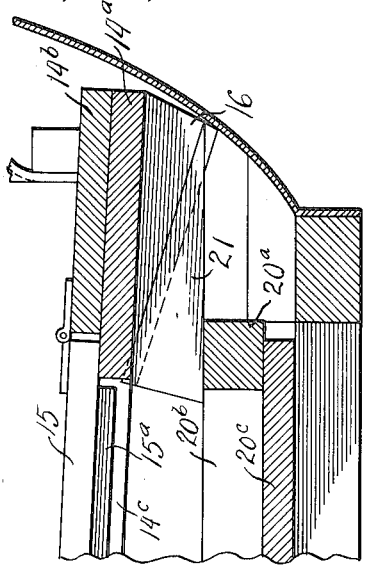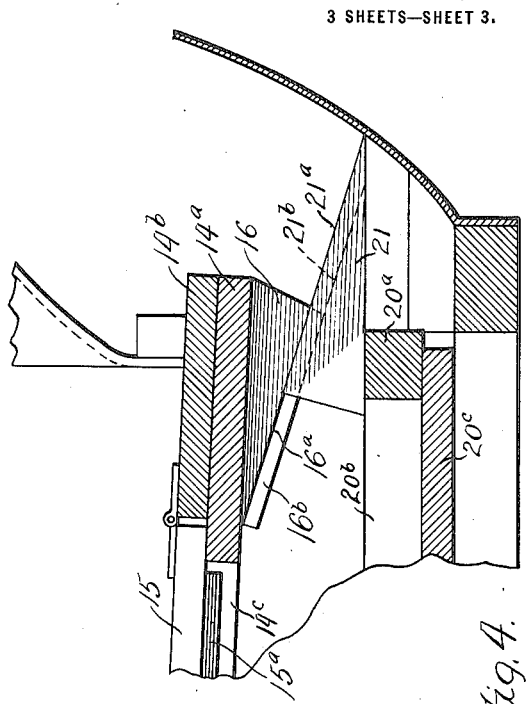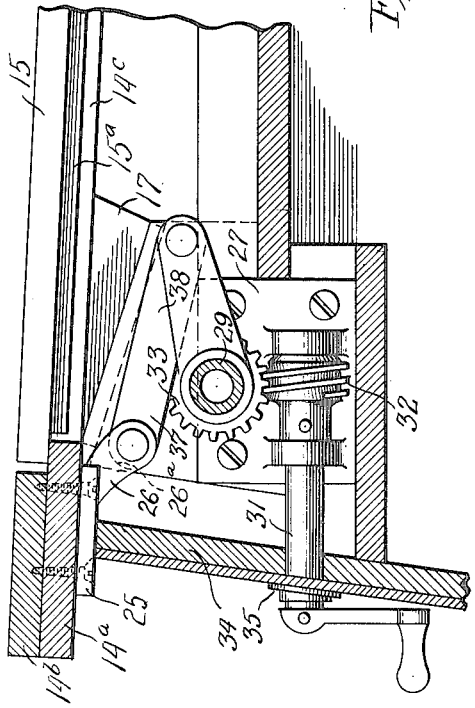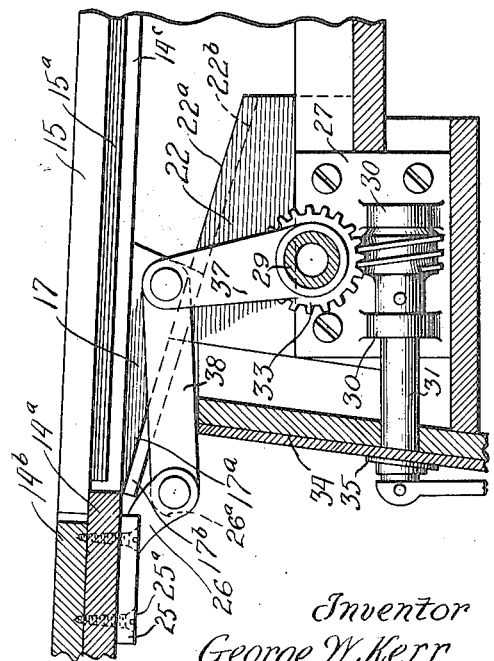

GEORGE W. KERR, OF SPRINGFIELD, MASSACHUSETTS, ASSIGNOR TO STEVENS-DURYEA COMPANY, OF CHICOPEE FALLS, MASSACHUSETTS, A CORPORATION OF MASSACHUSETTS.

VEHICLE-SEAT.

1,187,745.

Specification of Letters Patent. Patented June 20, 1916.

Application filed March 1, 1913. Serial No. 751,432.

*To all whom it may concern:*

Be it known that I, GEORGE W. KERR, a citizen of the United States, residing at Springfield, in the county of Hampden and State of Massachusetts, have invented certain new and useful Improvements in Vehicle-Seats, of which the following is a specification.

This invention relates to improvements in vehicle seats of the type similar to that shown and described in my co-pending application, Serial No. 706,198.

It has for its object to provide an improved form of vehicle seat especially adapted for use in automobiles.

The principal object of this invention is to provide an improved construction whereby the seat of the vehicle may be moved laterally and at the same time raised or lowered, together with means for accomplishing this purpose.

Other objects will be apparent as set forth in the specification and accompanying drawings, in which—

Figure 1 is a front elevation of my improved device. Fig. 2 is a transverse section taken along the line 2, 2 of Fig. 1. Fig. 3 is a transverse enlarged section of the seat and operating mechanism showing the same at one extreme position. Fig. 4 is a view similar to Fig. 3 showing the seat adjacent its other extreme; and Fig. 5 is a perspective detail view of one of the fins and engaging pins.

Like numerals refer to like elements throughout the drawings.

10 designates the back of the body of a vehicle such as an automobile. Located forwardly of this back is a seat back 11 containing the usual springs and other upholstering materials not shown. This seat back comprises further at its rearward portion a lining or backing 12 preferably formed of rather stiff flexible material, such as buckram, etc., and which is preferably secured to the upper portion of the vehicle back 10, as shown in Fig. 2 of the drawings. At the lower portion of the seat back is located the removable seat cushion 13 of conventional construction. This cushion is carried by what I term the seat proper or frame 14 comprising longitudinal superimposed strips $14^a$, $14^b$ and transverse connecting strips $14^c$ forming a rectangular opening which is normally covered by the cover 15 hinged at its rearward portion to the strip $14^b$ and having the reduced under portion $15^a$ as shown in Fig. 2. Secured to the under side of the rearward longitudinal strip $14^a$ are the spaced apart blocks or wedges 16 having the inclined under surface $16^a$ provided with the tongue or shoulder $16^b$. Adjacent the forward portion of the seat 14 on the under surface of each of the transverse strips $14^c$ are similar blocks or wedges 17 having the inclined under surface $17^a$ and the depending tongue or shoulder $17^b$. The inclined surfaces $17^a$ and $16^a$ are preferably of the same inclination with respect to the horizontal, as clearly shown in the drawings. The lower portion of the seat backing 12 is secured to the seat 14 by the shoulder strip $14^e$.

What I term the seat support or supporting frame 20 comprises a rearward longitudinal strip $20^a$, transverse side strips $20^b$, and a bottom board $20^c$. A pair of spaced apart wedges 21 carried at the rear portion of the seat support 20 are each provided with the upper inclined surface $21^a$ having a groove $21^b$ cut therein, the inclination of the surface being complementary to the inclination of the surface $16^a$ of the blocks 16. Carried upon the transverse strips $20^b$, or at the forward portion of the seat support, are the blocks or wedges 22 shown in the drawings having the upper inclined surfaces $22^a$ provided with the grooves $22^b$ cut therein, the inclined surfaces $22^a$ being complementary to the inclination of surfaces $17^a$ of block 17. The blocks 16 rest upon the corresponding blocks 21, the shoulders $16^a$ fitting in the grooves $21^a$ and similarly blocks 17 rest upon corresponding blocks 22, the shoulders or tongues $17^b$ fitting in the grooves $22^b$.

The inclination of the inclined surfaces of the blocks being similar, it will be apparent that sliding of the blocks 16 and 17 upon their corresponding supporting blocks 21 and 22 will operate to bodily raise or lower the seat frame 14 as it moves forwardly or back. To mechanically effect this movement the following construction is employed: Plates 25 are carried at the under surface of the forward longitudinal seat strip $14^a$ and are suitably secured thereto by screws $25^a$, or etc. An arm 26 depends downwardly from the plates 25, which are preferably formed integral therewith, being apertured at 26ª. These plates 25 carrying the arms 26 are spaced apart as shown clearly in Fig. 1. At the inner side of each of the side strips 20ᵇ is located and secured plates 27, 28, respectively, in which are located at the upper portion thereof bearing slots or apertures in which are journaled the extremities of the shaft 29. Spaced apart lugs 30 project from the plate 27 and are apertured to furnish a bearing for the operating rod 31, which carries between the lugs 30 a worm 32 meshing with a worm-wheel 33. This operating rod 31 extends outwardly through an aperture in the front or heel-board 34 of the seat support, a collar 35 being secured to the front portion thereof to furnish a bearing for the rod 31. At its outer extremity the rod 31 is provided with the operating handle 32' adapted to be rotated to correspondingly rotate the rod. Carried by the shaft 29 and secured thereto are the collars 36 provided with the integral outwardly extending crank arms 37 pivotally connected at their outer extremities to connecting arms 38, which are in turn pivotally secured at their other extremity to the arms 26 depending from plates 25.

It will be apparent that upon rotation of the operating rod 31 the worm 32 will actuate the worm-wheel 33 to rotate the shaft 29. The collars 36 being secured to the shaft 29 will rotate therewith and the arms 37 will thereupon, acting with the connecting arms 38, operate to move the seat 14, together with the backing 12 and seat cushion 13 forwardly or back, at the same time raising and lowering it as desired. The well-known characteristics of the worm-wheel and worm mechanism, while readily permitting rotation of the operation rod 31 to actuate the seat, will prevent motion being transmitted through worm-wheel 33 from the weight of persons riding upon the seat, so that the latter will remain in its adjusted position.

To prevent vertical displacement of the seat relative to the seat support, I provide a pair of angle members 40 having the upwardly extending flanges 41 secured by their horizontally located flanges 42 to the upper surface of side support strips 20ᵇ. These flanges 41 are provided with the inclined slots 43 therein spaced apart as shown, these slots being inclined similarly to the inclination of the blocks or wedges.

Angle members 44 have a flange 45 secured to the under surface of the seat frame 14 and a downwardly extending flange 46 located approximately parallel to and adjacent the upwardly extending flanges 41 of angle members 42. Pins and rollers 47 are carried by the flanges 46 of members 44 and project into and coact with the slots 43. The action of these angle members will be apparent inasmuch as they serve to prevent displacement vertically of the seat frame when the vehicle is bumping or jouncing along the road.

While I have shown and described my device with more or less particularity, I do not wish to be restricted to such showing beyond the scope of the appended claims.

What I claim is:

1. In combination with an automobile, a seat support carried thereby, a seat frame slidably mounted upon said seat support, and means to move said seat frame laterally with respect to said support, said means being arranged to simultaneously raise or lower said frame with respect to said support.

2. In combination with an automobile, a seat support carried thereby, a seat frame slidably mounted upon said seat support, means to move said seat frame laterally with respect to said support, said means and said seat support being arranged to simultaneously raise or lower said frame with respect to said support, and means to prevent displacement of said seat with respect to said support.

3. In combination with an automobile, a seat supporting structure carried thereby, said structure comprising blocks each provided with an inclined surface, a seat frame provided with blocks having similarly inclined surfaces resting upon and supported by said inclined surfaces of said first named blocks, and means to move said seat forward and back relative to said first named blocks, said blocks being arranged to raise or lower said seat frame by such movement.

4. In combination with an automobile, a seat supporting structure carried thereby, said structure comprising blocks provided with inclined surfaces, a seat frame provided with blocks having similarly inclined surfaces resting on and contacting with the inclined surfaces of said first named blocks, said first and second named blocks being provided with a tongue and groove connection, and means to move said seat frame on said first named blocks to raise or lower the same.

5. In combination with an automobile, a seat supporting structure carried thereby, said structure comprising blocks provided with inclined surfaces, a seat frame provided with blocks having similarly inclined surfaces resting on and contacting with the inclined surfaces of said first named blocks, said first and second named blocks being provided with a tongue and groove connection, means to move said seat frame on said first named blocks to raise or lower the same, and means to prevent displacement of said seat frame with respect to said first named blocks.

6. In combination with an automobile, a seat supporting structure carried thereby, said structure comprising blocks provided with inclined surfaces, a seat frame provided with blocks having similarly inclined surfaces resting on and contacting with the inclined surfaces of said first named blocks, said first and second named blocks being provided with a tongue and groove connection, means to move said seat frame on said first named blocks to raise or lower the same, means to prevent displacement of said seat frame with respect to said first named blocks, said means comprising a flange carried by said automobile, a second flange carried by said seat frame, and means operatively connecting said flanges to prevent vertical relative displacement thereof.

7. In combination with an automobile, a seat supporting structure comprising supporting members, a seat frame slidably supported upon said supporting members and adapted to be raised or lowered relative to said automobile upon movement thereof upon said supporting members, means to so move said seat frame, said means comprising a shaft operatively connected to said seat frame, a second operating shaft provided with engageable means and adapted, upon operation thereof, to operate said first named shaft to raise or lower said seat.

8. In combination with an automobile, a supporting means carried thereby, a seat slidably mounted on said means, means to move said seat, said means comprising a rotatable shaft operatively connected to said seat, a worm gear carried by said shaft, an operating shaft, a worm carried thereby and meshing with said gear whereby rotation of said supporting shaft will move said seat upon said supporting means.

9. In combination with an automobile, a supporting means carried thereby, a seat slidably mounted on said means, a rotatable shaft, means operatively connecting said shaft with said seat, said means comprising pivotally connected links, one of said links being attached to said shaft and another of said links being attached to said seat, and means to rotate said shaft.

10. In combination, a seat support, a seat frame slidably mounted upon said seat support, means to move the seat frame laterally with respect to said support, said support being arranged to raise or lower the frame with respect to the support during said movement, and means to prevent displacement of the seat with respect to said support.

11. In combination, a seat-supporting structure, said structure comprising blocks provided with inclined surfaces, a seat frame provided with blocks having similarly inclined surfaces resting on and contacting with the inclined surfaces of said first-named blocks, said first and second blocks being provided with a tongue and groove connection, and means to move the frame on said first-named blocks to raise or lower the same.

12. In combination, a seat-supporting structure comprising blocks provided with inclined surfaces, a seat frame provided with blocks having similarly inclined surfaces resting on and contacting with the inclined surfaces of said first named blocks, said first and second named blocks being provided with a tongue and groove connection, means to move the frame on said first-named blocks to raise or lower the same, means to prevent displacement of said seat frame with respect to said first-named blocks, said means comprising a flange fixed with respect to said first-named blocks, a second flange carried by the seat frame, and means operatively connecting said flanges to prevent vertical relative displacement thereof.

13. In combination, a seat-supporting structure comprising blocks having inclined surfaces, a seat frame comprising blocks having inclined surfaces adapted to coact with the inclined surfaces of said first-named blocks, a rotatable shaft, means operatively connecting said shaft with the seat frame, a worm gear carried by said shaft, an operating shaft, and a worm carried by said operating shaft and meshing with the worm gear, whereby rotation of said operating shaft will move the seat upon said supporting means.

In testimony whereof, I have subscribed my name.

GEORGE W. KERR.

Witnesses:
M. A. HASTINGS,
M. O. COWLES.